June 26, 1945.  C. W. KENDALL ET AL  2,378,930
METHOD AND MEANS FOR CHECKING CAMERA FOCUS
Filed April 19, 1943  2 Sheets-Sheet 1
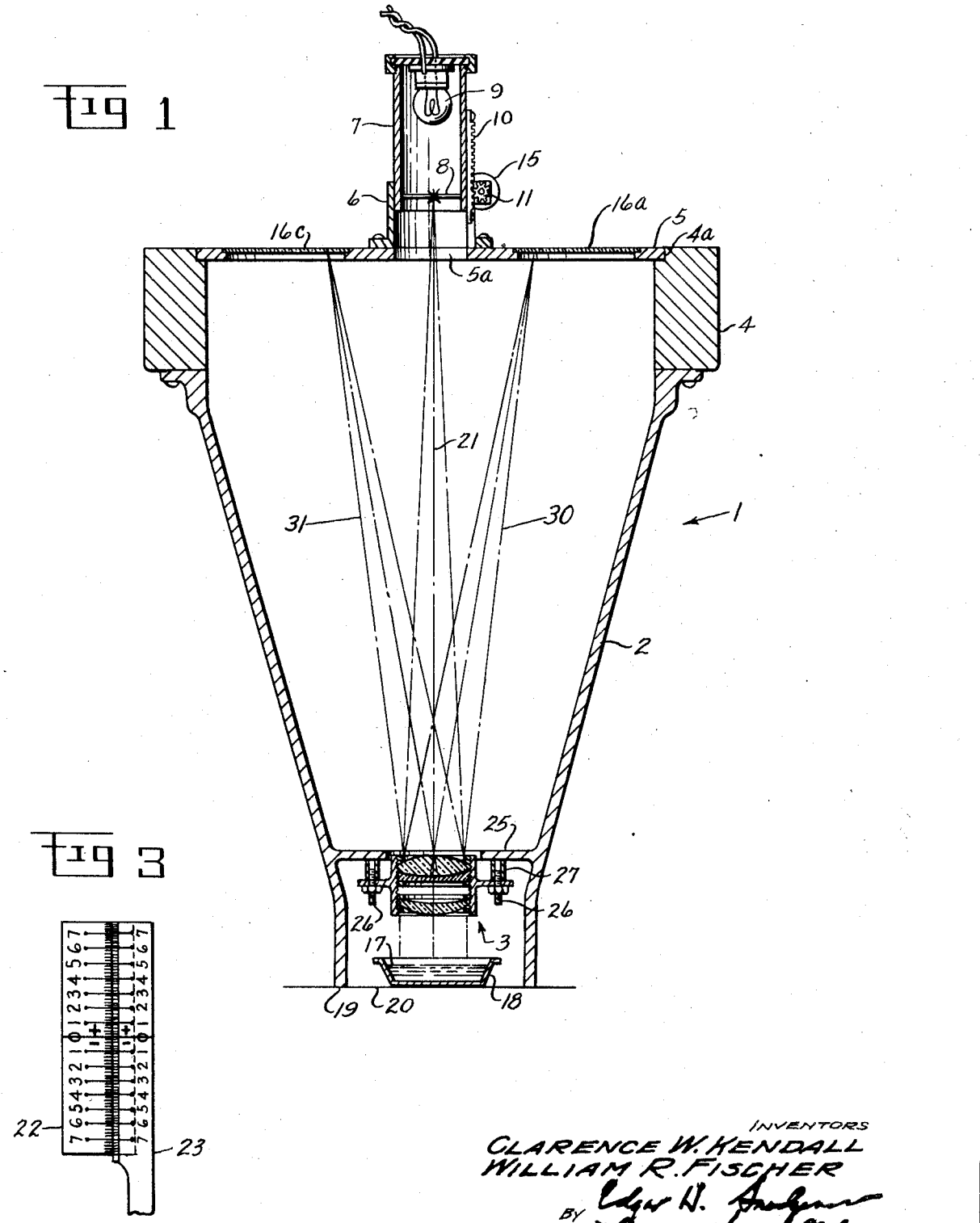

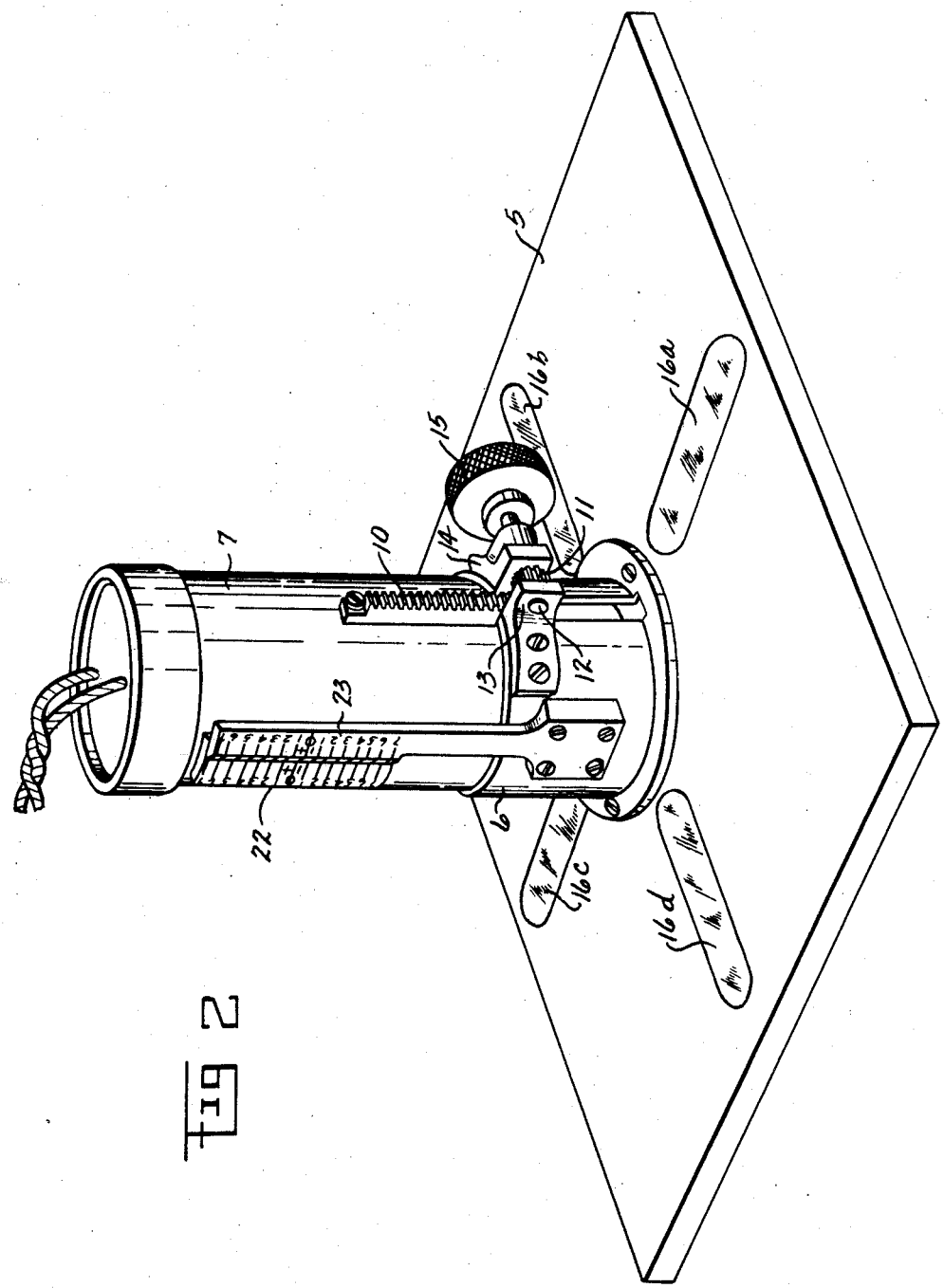

Patented June 26, 1945

2,378,930

UNITED STATES PATENT OFFICE 2,378,930

METHOD AND MEANS FOR CHECKING CAMERA FOCUS

Clarence W. Kendall and William Robert Fischer, Dayton, Ohio

Application April 19, 1943, Serial No. 483,550

20 Claims. (Cl. 88—1)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a method and means for checking the focus of a photographic camera for the purpose of determining whether the camera lens is properly positioned with reference to the geometrical axis of the camera and with reference to the expected focal plane of the camera.

If the camera lens is properly positioned its principal axis should coincide with the geometrical axis of the camera which is perpendicular to the plane of the negative photographic element at the center of the portion thereof within the field of the lens. In order to ensure the production of photographs characterized by sharpness of detail, it is important that the true focal plane of the lens substantially coincide with the plane of the negative photographic element which is to record the image of the object in the view of the camera lens.

This invention has particular application to the checking of the focus of cameras embodying fixed focus lenses such as telephoto cameras used in aerial photography, but its application to the checking of the focus of cameras employing adjustable focus objectives or lens systems of other types of cameras will likewise be advantageous. For the purpose of simplicity, the invention will be described in its application to the checking of the focus of cameras embodying fixed focus lenses of the type just mentioned, but it will be understood that the application of the invention is not intended to be so limited.

In cameras of the type particularly referred to embodying fixed focus lenses, the objective or lens system is unitary and permanently mounted in its initially determined condition with reference to the camera in its original installation, having been properly adjusted at such time so that the principal axis of the objective coincides with the geometrical axis of the camera, and such adjustment is intended to be maintained permanently. However, in the use of such cameras the unitary lens system or objective sometimes becomes twisted or cocked in use so that its principal axis no longer coincides with the geometrical axis of the camera, or the lens system or objective may have been caused through use to be moved axially along its principal axis or along the geometrical axis of the camera so that the true focal plane of the lens no longer coincides with the expected focal plane of the lens which must, in order to enable a camera to function properly, of necessity coincide with the plane of the photo-sensitive surface of the negative photographic element which may comprise a sensitized film or plate. Either of the respective conditions of cocking or twisting of the lens system or objective or of the undesired axial movement thereof will adversely affect the focus of the camera, and either of these conditions and the extent to which they are present may be detected by the method and means of the present invention so as to enable the operator to determine the correction required.

It is a primary object of the present invention to provide a method and means for checking the focus of a photographic camera which means and method are capable of use in the field under conditions where the ordinary laboratory facilities are unavailable and which method and means are capable of use without the necessity of elaborate equipment for accomplishing the purposes mentioned.

Another object of the invention is to provide a method and means for checking the focus of a photographic camera whereby the camera itself may be simply and quickly converted to use as an autocollimator for accomplishing the foregoing purposes.

Another object of the invention is to provide camera focus checking equipment of a simple and efficient design which may be quickly and readily associated with a photographic camera for converting the same for use as an autocollimator for the purposes described.

Another object of the invention is to provide camera focus checking means of the type described comprising a simple and efficient unit which may readily be cooperably associated with the portion of a camera body normally receiving the magazine containing the negative photographic element.

In general, the method of the invention consists in arranging an image forming target adjacent to the geometrical axis of the camera, an image receiving element in the plane normally occupied by the negative photographic element, and an optically flat surface on the opposite side of the lens from the target and within the field of the lens so that the light rays emanating from the target pass through the camera lens and are reflected by said surface back through the lens in the direction of the image receiving element, and then adjusting the target so that an image thereof is produced in sharp focus upon the image receiving element. If the target lies in the same plane as the image receiving element (which is the plane normally occupied by the negative photographic element), when the image of the target is in focus on the image receiving element, such condition will indicate that the lens is properly positioned in the camera and that therefore the camera is properly focused so that the true focal plane of the lens substantially coincides with the plane of the negative photographic element, which is a prime requisite of proper focus of the camera. If at the time when the target image is in focus on the image receiving element, which may comprise a ground glass or the like, the plane of the target is not in the plane of the image receiving element, such condition will indicate that the camera is out of focus. Under such condition the true focal plane of the lens may be ascertained by measuring the distance between the plane of the target and the plane of the image receiving element, and the true focal plane of the lens will be in a plane half the distance between the plane of the target and the plane of the image receiving element.

The very simple and efficient equipment for converting a camera into an autocollimator for performing the method of invention, in general, comprises a support which is adapted to be received by the body portion of the camera normally receiving the camera magazine containing the film or other negative photographic element. Upon this support is mounted a target container in which is fixed a suitable target, said target plate being associated with the support so as to be movable relative thereto to move the target in the direction of the geometrical axis of the camera. Also mounted on the support is an image receiving element such as a ground glass or the like so arranged as to lie in the plane normally occupied by the negative photographic element when the support is cooperably associated with the camera. The target tube is preferably mounted so that the center of the target lies on, or is as close as possible to, the geometrical axis of the camera, and the ground glass or image receiving element is positioned to one side of the axis of movement of the target. According to the disclosure herein, suitable means for illuminating the target and suitable means for moving the target tube axially are provided and a plurality of image receiving elements are preferably provided symmetrically located with respect to the axis of movement of the target.

In practicing the method of the invention the front of the camera is arranged with reference to an optically flat surface, such as may be provided by an opaque liquid, so that said surface is on the opposite side of the lens from the target. The camera or the optically flat surface is manipulated so that light rays emanating from the target are caused to pass through the camera lens and be reflected by the optically flat surface back through the lens in the direction of the image receiving element. The target is then moved in the direction of the geometrical axis of the camera and an image of the target is brought into sharp focus on the image receiving element. The manipulation of the camera, above referred to, may consist of tilting the camera with reference to the optically flat surface so as to cause the light rays emanating from the target to be reflected from said surface at the proper angle to cause the reflected rays to strike the image receiving element.

A suitable scale may be provided on the target tube for cooperation with a stationary scale on the support whereby to indicate the distance between the plane of the target and the plane of the image receiving element, if any, whereby to indicate the true focal plane of the lens with reference to the expected focal plane thereof. The true focal plane of the lens should coincide with the plane normally occupied by the negative photographic element.

By providing a plurality of image receiving elements on the support located symmetrically with reference to the axis of movement of the target, images of the target may be formed successively on each of said image receiving elements by manipulation of the camera or the optically flat surface whereby successive measurements of the difference in plane of the target and first one of the image receiving elements and then the other of said elements, as the image is brought into focus respectively thereupon, may be determined, whereby to indicate the existence or non-existence of a twisted or cocked condition of the lens, and/or the extent of twisting or cocking of said camera lens.

Other objects, advantages, and features of novelty of the invention will appear as the description of the invention proceeds in conjunction with the accompanying drawings, in which Figure 1 is a longitudinal sectional view through a photographic camera and the auxiliary focus checking equipment applied thereto for the purpose of illustrating the embodiment of the invention herein disclosed.

Figure 2 is a perspective view illustrating the focus checking attachment unit of the invention shown in Figure 1 separate from the camera.

Figure 3 is an enlarged view of the vernier scale means designed to indicate the difference if any in the plane of the target and the plane of the image receiving element.

Now referring to the drawings for a detailed description of the invention, the numeral 1 generally indicates a photographic camera comprising a lens cone 2 at the front end (lower end of Figure 1) of which is mounted the fixed objective or lens system generally indicated by the numeral 3, and a body portion 4 at the rear end (top end of Figure 1) of which the film magazine, containing the negative photographic element, is normally received. The body portion 4 is provided with an internal shoulder 4a within which the film magazine (not shown) is normally received and when the magazine is so received, the negative photographic element, such as a sensitized film or plate, is adapted to lie in the expected focal plane of the lens system 3. The lens system 3 is hereinafter referred to for simplicity as the lens.

For the purposes of carrying the invention into practice, a focus checking attachment unit is provided for association with the rear end of the camera in place of the film magazine normally received thereby. Said attachment unit includes a support comprising a supporting plate 5 adapted to be received by the peripheral shoulder 4a located as above stated at the rear end of the body portion 4 of the camera. Mounted on the supporting plate 5 is a hollow hub element 6, the hollow center of which is registered with an aperture 5a in the supporting plate 5. Received within the hub 6, and axially movable relative thereto, is a target tube or housing 7 within which is suitably fixed a translucent target plate 8. A lamp 9 is provided in the target tube 7 for illuminating the target 8. Means is provided for moving the target tube 7 axially relative to the hub 6, said means comprising rack and pinion means including the rack 10 integral with the target tube 7 and the pinion 11 meshing with the rack 10. The pinion 11 is mounted on a shaft 12 journalled in bearings 13 and 14 integral with the hub 6. A knurled knob 15 is fixed to the shaft 12 for facilitating manipulation of the rack and pinion means for causing the desired axial movement of the target tube 7.

An image receiving element 16a is mounted on the support 5 so that, when the support 5 is received on the shoulder 4a, the element 16a will lie in the plane which would be normally occupied by the negative photographic element if the magazine containing such element were cooperably received at the rear end of the camera in the use of the camera for its intended purpose. The image receiving element 16a may comprise a ground glass and in such event the ground glass will be mounted on the support 5 in such a manner that when the support is received as aforesaid the ground side will be in the plane normally occupied by the sensitized surface of the negative photographic element. A plurality of image receiving elements 16a, 16b, 16c and 16d are preferably provided, mounted on a support 5 in the manner just described and symmetrically positioned with reference to the axis of movement of the target tube 7 and with reference to each other. Suitable apertures are provided in the supporting plate 5 to receive the respective image receiving elements whereby an image focused by the lens 3 upon one of the respective image receiving elements 16a, 16b, 16c or 16d may be viewed from the rear of the support 5; i. e. from the top side of support having reference to Figures 1 and 2.

As illustrated the image receiving elements 16a and 16c are diametrically positioned on opposite sides of and symmetrically positioned with respect to the axis of movement of the target tube 7 and the image receiving elements 16b and 16d are likewise diametrically and symmetrically disposed on either side of the axis of movement of the target tube 7, the four image receiving elements being so disposed that lines joining the centers of the respective pairs of elements referred to would constitute lines normal to one another.

An optically flat surface is arranged adjacent to and within the field of the lens 3 on the opposite side of said lens from the target 8. A suitable optically flat surface may be provided by an opaque liquid such as lubricating oil, ink, or other suitable liquid such as indicated by the numeral 17 as contained within a vessel 18.

The plane of the target 8 is mounted with reference to the tube 7 so that its plane will be parallel to the plane of the image receiving elements and consequently parallel to the plane normally occupied by the negative photographic element, when the attachment unit of Figure 2 is assembled with relation to the camera as indicated in Figure 1. Preferably the target 8 is so mounted with reference to the support 5 that, when the attachment unit is associated with the camera as indicated in Figure 1, the center of the target will lie on the geometrical axis of the camera which axis may, for the purposes hereof, be represented by the broken line 21. The center of the target 8 need not necessarily be on the geometrical axis 21 of the camera in order to utilize the invention for the purposes indicated, but it is preferable that the center of the target 8 be located on or as close as possible to the geometrical axis of the camera for most accurate results.

For the purposes of the description of the invention herein, the term "true focal plane" of the lens may be defined as the plane adjacent the rear of the camera at which light rays from a point on the opposite side of the lens, and within the field thereof, will converge or focus. As used herein, the term "expected focal plane" of the lens may be considered as synonymous with the plane in which the negative photographic element, or the sensitized surface thereof, would normally lie when the negative photographic element is operatively assembled with the camera, and it is desired or "expected" that the true focal plane of the lens will substantially coincide with the plane of the negative photographic element when latter is operatively associated with the camera. The image receiving elements 16a, 16b, 16c, and 16d, and primarily the ground surface of the ground glass comprising said elements, are mounted on the support 5 so as to be in the expected focal plane of the lens 3, when the support 5 is operatively associated with the camera.

The "geometrical axis" of the camera may be defined, for the purposes hereof, as the axis passing through the lens and intersecting the plane of the sensitized surface of the negative photographic element at the center thereof and perpendicularly to said plane when the negative photographic element is operatively associated with the camera. Normally, the principal axis of the lens should coincide with the geometrical axis of the camera, if the camera is properly focused.

In the practice of the invention, the film magazine normally associated with the camera having first been removed, the attachment unit of Figure 2 is assembled in association with the camera 1 as indicated in Figure 1, with the camera standing on the front edge 19 of the lens cone 2 on the surface 20 upon which the optically flat surface 17 is positioned. The lamp 9 may now be caused to illuminate the target 8 and the camera tilted with reference to surface 20 so that light rays emanating from the target 8 will be caused to pass through lens 3 to the optically flat surface 17 and reflected thereby back through the lens 3 so that the reentrant rays are caused to be directed by the optically flat surface 17 in the direction of one or the other of the image receiving elements 16a, 16b, 16c, or 16d. When the light rays are caused to be reflected by the surface 17 back through the lens 3 toward the image receiving element 16a, the reflected beam may be represented by the broken line 30, Figure 1. Likewise, when the light rays are caused to be reflected by surface 17 back through lens 3 toward element 16c, the reflected beam may be represented by the broken line 31. The target tube 7 is then adjusted axially by operation of the knurled knob 15 until an image of the target is brought into clear focus upon one of said image receiving elements, as for example, the element 16a.

If the plane of the target 8 coincides with the plane of the image receiving element 16a when the image of the target is in sharp focus on said element, such condition will indicate that the true focal plane of the lens 3 coincides with its expected focal plane which is the plane normally occupied by the negative photographic element when the camera is assembled with its film magazine for its intended purpose of photographing objects. Thus, if the plane of the target 8 coincides with the plane of the image receiving element 16a, when the image of the target 8 is in sharp focus on said element, such condition will indicate that the camera is in proper focus.

If, however, the plane of the target 8 is above or below the plane of the image receiving element 16a at a time when the target image is in sharp focus on said element 16a, such condition will indicate that the true focal plane of the lens 3 lies in a plane substantially half way between the plane of the target and the plane of the image receiving element and that, therefore, the camera is out of focus.

Vernier scale means is provided for indicating the relation of the plane of the target 8 to the plane of the image receiving elements 16a, 16b, 16c, and 16d. This vernier scale means comprises a vernier scale element 22 on the target tube 7 movable with the latter and a vernier scale element 23 fixed to the support 5. Conveniently for this purpose the vernier scale element 23 is shown as fixed to the hub element 6. The scale elements 22 and 23 bear appropriate indicia indicating standard units of measurement, said indicia comprising consecutively numbered indication markings running in either direction from the central zero indication in the case of each of the scale elements 22 and 23. The vernier scale indicia are arranged so that the zero indications coincide when the target and the image receiving elements are in the same plane. The vernier scale indicia are preferably calibrated so that when indication lines on the respective scale elements 22 and 23 coincide at some point other than zero, indicating that the plane of the target 8 is above or below the plane of the image receiving elements, the scale reading will indicate the actual position of the true focal plane of the lens with reference to the expected focal plane. The true focal plane of the lens will be approximately one half the vertical distance between the plane of the target and the plane of the image receiving element upon which the target image is in sharp focus under the conditions above mentioned. As illustrated, the scale indicia on the respective elements 22 and 23 are arranged to run consecutively in both directions, plus and minus from zero, so that when the zero indication on the scale element 22 is below the zero indication on the scale element 23, the reading will be taken on the lower, or negative, portions of the scale elements 22 and 23 indicating the position of the true focal plane of the lens below, or in the direction of the lens from the expected focal plane; and likewise when the zero indication on the scale element 22 is above the zero indication on the scale element 23 the reading will be taken on the upper or positive portions of the scale elements 22 and 23 indicating that the true focal plane of the lens 3 is above the expected focal plane.

The camera may be tilted so that the target image is reflected from the optically flat surface 17 in the direction of, and brought into focus by manipulation of the target 8, successively on the respective image receiving elements 16a, 16b, 16c and 16d and successive readings of the vernier scale taken for the respective conditions of sharp focus of the target image on the respective image receiving elements. If an out-of-focus condition exists and the vernier scale readings are all the same for the sharp focus condition of the target image on each of the image receiving elements, this circumstance will indicate that the principal axis of the lens is in coincidence with the geometrical axis 21 of the camera, but that the lens 3 has been axially moved relative to the camera in the direction of said axis. The extent to which the lens must be moved axially to correct the out-of-focus condition will be readily determined under such conditions from the scale reading.

If, however, the scale readings are different for the sharp focus condition of the target image on any two diametrically opposed image receiving elements such as 16a and 16c, or 16b and 16d, a condition of cocking or twisting of the lens 3 so that its principal axis is out of alignment with the geometrical axis of the camera will be indicated, and the extent to which the lens is twisted in one direction or another will likewise be indicated by the difference between the vernier scale readings for the sharp focus condition of any two diametrically opposed image receiving elements. For example, if the scale reading for the sharp focus condition of the target image on the image receiving element 16a should be greater than the scale reading for the sharp focus condition of the target image on the image receiving element 16c, such condition would indicate that the principal axis of the lens 3 is misaligned to the right of the geometrical axis 21, having reference to Figure 1.

The fixed focus lenses employed in the type of camera indicated in Figure 1 are usually mounted on the flange 25 by means of bolts 26 and spacing sleeves 27 so that adjustment of a lens may be made after the focus is checked by replacing the sleeves 27 with longer or shorter sleeves to correct the particular out-of-focus condition found to exist.

It will be understood that the reflection of the light rays emanating from the target in the direction of one or the other of the image receiving elements 16a, 16b, 16c and 16d may be accomplished by altering the position of the optically flat surface with reference to the camera rather than by tilting the camera as above described, if an optically flat surface other than a liquid is utilized.

From the foregoing it will be understood that several different methods of checking the focus of a camera may be employed utilizing the equipment hereinbefore described. If four image receiving elements are employed as shown, the target image may be brought into focus successively on the respective image receiving elements and scale readings taken for the sharp focus condition of the target image on each of the respective image receiving elements, with the results above indicated. If only two image receiving elements are used, they will be arranged like elements 16a and 16c, or like 16b and 16d, i. e. on opposite sides of and diametrically and symmetrically disposed with respect to the axis of movement of the target; under such condition, the camera will be tilted, or the optically flat surface arranged, so that the target image is reflected by said surface in the direction of, and brought into focus by manipulation of the target 8, upon one of said pair of image receiving elements such as 16a; a measurement of the distance between the plane of the target and the plane of element 16a, or a reading of the scale, is then taken. Next, the camera is tilted, or the optically flat surface arranged, so that the target image is reflected in the direction of the other of said pair of image receiving elements, namely, in this instance, element 16c; the target image is now brought into focus on element 16c by manipulation of the target 8; and a measurement (of the distance between the plane of the target and the plane of element 16c), or a reading of the scale is taken under this condition. Any difference in the scale readings for the two in-focus conditions of the target image on the respective image receiving elements 16a and 16c will indicate the direction and extent of angular twist of the lens in one plane.

Now the elements 16a and 16c may be moved in their original plane 90 degrees angularly from their initial positions so as to occupy positions corresponding with the positions that elements 16b and 16d occupy when the latter are used, as in the embodiment illustrated, the camera lens being maintained in its original position; that is, not affected by the angular shifting of the single pair of image receiving elements being used under the hypothesis now being described. Now the target image is again brought into focus on the element 16a and a measurement, or scale reading, is taken; then by similar procedure the target image is again brought into focus on the element 16c and a measurement, or a scale reading, is taken. Any difference in the scale readings for the two new in-focus conditions of the target image on the elements 16a and 16c will indicate the direction and extent of angular twist, if any, of the lens in a plane perpendicular to the plane of twist ascertainable from the first series of in-focus conditions of the target image on said elements 16a and 16c.

Similarly, a single image receiving element, such as 16a alone may be employed to secure the same results. Thus, the target image may be brought into focus on said single element 16a and a measurement, or a scale reading taken; then the element 16a may be moved in its original plane angularly 180 degrees, the target image again brought into focus on element 16a and a like measurement, or scale reading, taken. These readings would determine lens twist, if any, in one plane. Or, the single element 16a could be moved to successive positions 90 degrees apart in the same plane, the target image brought into focus on said element 16a and scale readings taken, at each successive position.

Where field curvature of the lens exists, the apparatus of the invention may be employed to determine the optimum positioning of the lens so that the average focal plane of the lens may be made to coincide with the plane of the negative photographic element when the latter is operatively associated with the camera. To this end, the following procedure may be utilized. The camera is successively tilted or the optically flat surface successively arranged in different angular positions and the target manipulated so that the target image is brought into sharp focus successively at different positions on one of the image receiving elements such as 16a. The angle of tilt of the geometrical axis of the camera with reference to the optically flat surface, the scale reading, and the character of the image are all noted with respect to each respective sharp focus condition of the target image on said one image receiving element. From these data, the average focal plane of the lens may be ascertained and the lens adjusted so that said average focal plane is made to coincide with the plane normally occupied by the negative photographic element when the latter is operatively associated with the camera.

From the foregoing it will be apparent that a very simple and efficient method and means for checking the focus of a camera is provided by the present invention which method and means may be used in the field where elaborate laboratory equipment is not available, since the attachment unit is readily adapted for being quickly associated with the camera in place of the film magazine and a suitable optically flat liquid such as engine oil or the like for providing an optically flat surface for the purpose of the invention is generally available wherever a camera may be used.

Having thus described our invention what we claim as new and desire to secure by Letters Patent of the United States is:

1. In camera focus checking means of the class described adapted for association with a photographic camera including a focusing lens and a body portion adapted to receive a negative photographic element, in combination, a support receivable within the negative photographic element receiving body portion of the camera, a target mounted on said support in such a manner as to be positioned adjacent the geometrical axis of the camera when the support is received as aforesaid, and an image receiving element mounted on said support so as to be in the expected focal plane of the camera lens when the support is received as aforesaid, said target being movable relative to said support in a direction normal to the plane of the image receiving element.

2. In camera focus checking means of the class described adapted for association with a photographic camera including a focusing lens and a body portion adapted to receive a magazine containing a negative photographic element, in combination, a support receivable within said body portion in the position normally occupied by said magazine, a target mounted on said support in such a manner as to be positioned adjacent the geometrical axis of the camera when the support is received as aforesaid, and an image receiving element mounted on said support in such a manner that, when the support is received as aforesaid, the plane of said image receiving element will coincide with the plane normally occupied by the negative photographic element, said target being movable relative to said support in a direction normal to the plane of the image receiving element.

3. Camera focus checking means as claimed in claim 1, and means for moving said target in a direction normal to the plane of said image receiving element to a position in register with, and also to positions on either side of, said plane, while maintaining the plane of the target in the plane of, or in a plane parallel with, the plane of said image receiving element.

4. Camera focus checking means as claimed in claim 1 wherein the image receiving element comprises a ground glass.

5. Camera focus checking means as claimed in claim 1 wherein the image receiving element comprises a ground glass mounted on the support so that the ground surface of said glass will be in the expected focal plane of the lens when the support is received by the camera body portion as aforesaid.

6. Camera focus checking means as claimed in claim 1 wherein the target is mounted on the support in such a manner that its center will be in alignment with the geometrical axis of the camera when the support is received by the camera body as aforesaid.

7. In camera focus checking means of the class described adapted for association with a photographic camera including a focusing lens and a body portion adapted to receive a negative photographic element, in combination, a support receivable within said body portion, a target mounted on said support in such a manner that the plane of the target will be positioned in a plane parallel to or coincident with the plane normally occupied by the negative photographic element and with the center of said target aligned with the geometrical axis of the camera when the support is received as aforesaid, and an image receiving element mounted on said support so that the plane of said image receiving element will coincide with the plane normally occupied by the negative photographic element when the support is received as aforesaid, said image receiving element being spaced from said target in the direction of said latter plane, said target being movable in a direction normal to said plane.

8. In camera focus checking means of the class described adapted for cooperation with a photographic camera including a focusing lens and a body portion adapted to receive a negative photographic element, in combination, a support receivable within said body portion, a target mounted on said support in such a manner as to be adjacent to and movable along a line extending parallel with the geometrical axis of the camera when the support is received as aforesaid, and a pair of image receiving elements located symmetrically with respect to the target at diametrically opposed positions on either side of the axis of movement of the target, said image receiving elements being mounted on said support so that the planes of said latter elements will coincide with the plane normally occupied by the negative photographic element when the support is received as aforesaid.

9. Camera focus checking means as claimed in claim 8, and a second pair of image receiving elements mounted on said support in the same plane and at diametrically opposed positions on either side of the axis of movement of the target and located symmetrically with respect to said target and with respect to the individual elements of said first pair of image receiving elements.

10. In camera focus checking means of the class described adapted for association with a photographic camera including a focusing lens and a body portion adapted to receive a negative photographic element, in combination, a support receivable within said body portion, an image receiving element mounted on said support so that the plane of said latter element will coincide with the expected focal plane of the camera lens when the support is received as aforesaid, a target tube mounted on said support for movement relative thereto in a direction normal to the plane of said image receiving element, and a target fixed in said tube with its plane parallel to the plane of the image receiving element in such a manner that the center of the target will be adjacent the geometrical axis of the camera when the support is received as aforesaid.

11. Camera focus checking means as claimed in claim 10 combined with operating means for effecting axial movement of the target tube.

12. Camera focus checking means as claimed in claim 10, and scale indicia on said target tube, and scale indicia on said support cooperable with said first mentioned scale indicia for indicating the position of the target with respect to the plane of the image receiving element.

13. Camera focus checking means as claimed in claim 10, and illuminating means associated with said tube for illuminating said target.

14. In camera focus checking means of the class described, the combination with a photographic camera including a focusing lens, of a target positioned adjacent the geometrical axis of the camera and movable along a line parallel with said axis with the plane of said target parallel to the expected focal plane of the camera lens, an image receiving element positioned with its plane coincident with the expected focal plane of the lens, said target and said image receiving element being arranged on the same side of said lens in such a manner that light rays emanating from said target may be reflected by an optically flat surface positioned on the opposite side of said lens from said target so as to pass from said surface through said lens toward said image receiving element, said target being movable along said line to produce an image of said target in focus on said image receiving element when the light rays emanating from said target are reflected from an optically flat surface as stated.

15. In camera focus checking means of the class described, the combination with a photographic camera including a focusing lens and a body portion adapted to receive a negative photographic element, of a target positioned adjacent the geometrical axis of the camera and movable along a line parallel with said axis with the plane of said target parallel to the expected focal plane of the camera lens, an image receiving element positioned with its plane in the plane normally occupied by said negative photographic element, said target and said image receiving element being positioned on the same side of said lens and an optically flat surface positioned at the opposite side of the lens from the target, said target, said surface, and said image receiving element being arranged so that light rays emanating from said target are reflected by said surface through said lens toward said image receiving element, said target being movable along said line to produce an image of said target in focus on said image receiving element.

16. The method of checking the focus of a photographic camera including a focusing lens and a body portion adapted to receive a negative photographic element, which comprises placing an image forming target adjacent to the geometrical axis of the camera and in a plane parallel to the plane normally occupied by the negative photographic element, placing an image receiving element in the plane normally occupied by the negative photographic element, placing an optically flat surface on the opposite side of the lens from the target and within the field of the lens, arranging said surface relative to the geometrical axis of the camera so that light rays emanating from said target are caused to pass through said lens, fall upon said surface and be reflected thereby back through said lens in the direction of said image receiving element, and moving the target along a line parallel with the geometrical axis of the camera while maintaining the target in a plane parallel to its initial plane until an image of said target is brought into clear focus on said image receiving element.

17. The method of checking the focus of a photographic camera including a focusing lens and a body portion adapted to receive a negative photographic element, which comprises placing an image forming target adjacent to the geometrical axis of the camera and in a plane parallel to the plane normally occupied by the negative photographic element, placing an image receiving element in the plane normally occupied by the negative photographic element, placing an optically flat surface on the opposite side of the lens from the target and within the field of the lens, arranging said surface relative to the geometrical axis of the camera so that light rays emanating from said target are caused to pass through said lens, fall upon said surface and be reflected thereby back through said lens in the direction of said image receiving element, and moving the target along a line parallel with the geometrical axis of the camera while maintaining the target in a plane parallel to its initial plane until an image of said target is brought into clear focus on said image receiving element, and then measuring the vertical distance between the plane of the target and the plane of the image receiving element.

18. The method of checking the focus of a photographic camera including a focusing lens and a body portion adapted to receive a negative photographic element, which comprises placing an image forming target adjacent to the geometrical axis of the camera and in a plane parallel to the plane normally occupied by the negative photographic element, placing an image receiving element in the plane normally occupied by the negative photographic element, placing an optically flat surface on the opposite side of the lens from the target and within the field of the lens, arranging said surface relative to the geometrical axis of the camera so that light rays emanating from said target are caused to pass through said lens, fall upon said surface and be reflected thereby back through said lens in the direction of said image receiving element, moving the target along a line parallel with the geometrical axis of the camera while maintaining the target in a plane parallel to its initial plane until an image of said target is brought into clear focus on said image receiving element, then measuring the vertical distance between the plane of the target and the plane of the image receiving element, moving said image receiving element in its initial plane angularly 180° relative to said target, again adjusting the target along a line parallel with the geometrical axis of the camera until an image of said target is brought into clear focus on said image receiving element, and again measuring the vertical distance between the plane of the target and the plane of the image receiving element.

19. In camera focus checking means of the class described adapted for association with a photographic camera including a focusing lens and a body portion adapted to receive a negative photographic element, in combination, a support receivable within said body portion, an image receiving element mounted on the support in such a manner that, when the support is received as aforesaid, the plane of said image receiving element will coincide with the plane normally occupied by the negative photographic element, and a target mounted on said support in such a manner as to be positioned adjacent the geometrical axis of the camera and movable relative to said support along a line parallel to said axis, with the plane of said target parallel to or coincident with the plane of said image receiving element when the support is received as aforesaid, whereby light rays emanating from said target may be reflected by a reflecting surface positioned on the opposite side of the camera lens from the target so as to pass from said surface through said lens to said image receiving element, said target being movable along said line to produce an image of said target in focus on said image receiving element when the light rays emanating from said target are reflected from a reflecting surface as aforesaid.

20. In camera focus checking means of the class described, adapted for association with a photographic camera including a focusing lens and a body portion adapted to receive a negative photographic element, in combination, a support receivable within said body portion, an image receiving element mounted on the support in such a manner that, when the support is received as aforesaid, the plane of said image receiving element will coincide with the plane normally occupied by the negative photographic element, a target mounted on said support in such a manner as to be positioned adjacent the geometrical axis of the camera and movable relative to said support along a line parallel to said axis with the plane of said target parallel to or coincident with the plane of said image receiving element, and a reflecting surface positioned at the opposite side of the camera lens from the target, said target, said surface, and said image receiving element being arranged so that light rays emanating from said target are reflecting by said surface through said lens toward said image receiving element, said target being movable along said line to produce an image of said target in focus on said image receiving element.

CLARENCE W. KENDALL.
WILLIAM ROBERT FISCHER.